Dec. 4, 1923. 1,476,048
G. BUCKY
GRID FOR PROTECTING RÖNTGEN IMAGES AGAINST SECONDARY RAYS
Filed May 17, 1923
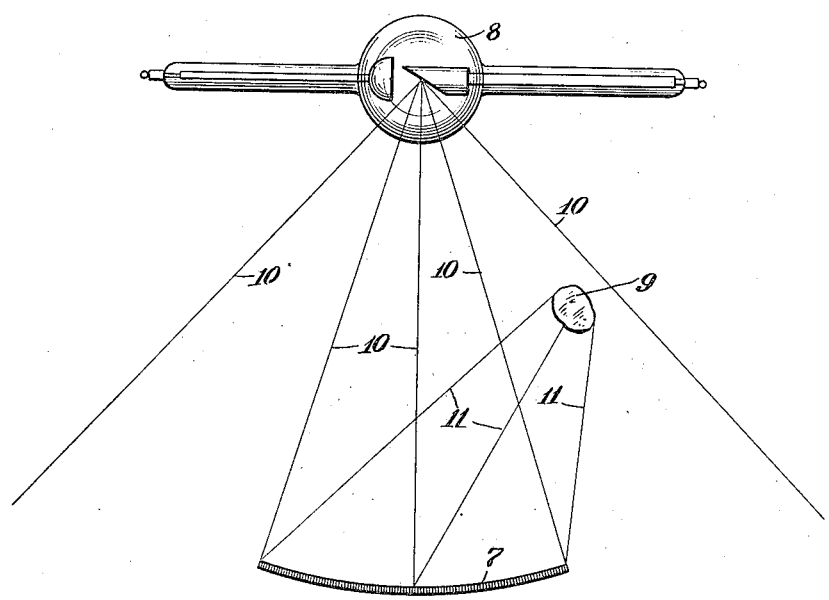
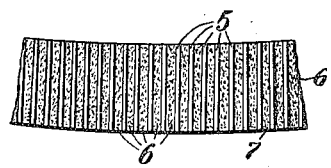
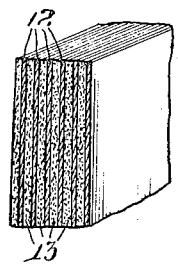
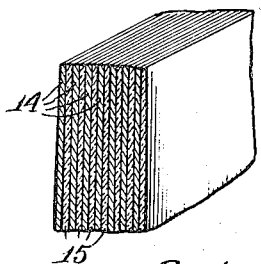
INVENTOR
Gustav Bucky
BY Walton Harrison,
HIS ATTORNEY Patented Dec. 4, 1923.

1,476,048

UNITED STATES PATENT OFFICE.

GUSTAV BUCKY, OF BERLIN, GERMANY, ASSIGNOR TO WAPPLER ELECTRIC CO., INC., A CORPORATION OF NEW YORK.

GRID FOR PROTECTING RÖNTGEN IMAGES AGAINST SECONDARY RAYS.

Application filed May 17, 1923. Serial No. 639,694.

*To all whom it may concern:*

Be it known that I, GUSTAV BUCKY, a citizen of the German Empire, residing at Berlin W., Germany, have invented certain new and useful Improvements in Grids for Protecting Röntgen Images Against Secondary Rays (for which I have filed application for patent in Germany on the 15th day of May, 1922, application Nr. B 104,821, IX/30a), of which the following is a specification.

The secondary Röntgen rays that arise, when Röntgen rays pass through a body exposed to them for purposes of photography, bring about a blurred effect in the photos made by the primary Röntgen rays. This blurred effect has heretofore been avoided by intercepting the secondary rays by means of a grid, disposed (almost) impervious to Röntgen rays. This grid being fixed between the body and the photographic plate and having passages extending in the direction of travel of the primary rays. Although this was a great improvement with regard to the clearness of the photos taken, especially of soft parts of the body, the clearly defined shadow that the grid threw on the fluoroscopic screen or photographic plate was considered a drawback. And therefore in fluoroscoping the grid was sometimes shifted, in order to expose to the X-rays the parts otherwise shielded therefrom. In taking photos the same course was followed in order to get rid of the troublesome grid shadow as far as possible. But in order to avoid getting photos showing stripes due to the shadows, it was necessary to shift the grid at perfectly regular intervals, which could only be done by a mechanical contrivance, for instance, a spring motor or an electric motor. Such a device must of course increase the amount of attendance required or if operated automatically must be considerably more expensive.

According to the invention by using a stationary grid the shadow of the grid, so annoying to an observer afterward examining the photo, is done away with. For this purpose, I employ a grid of such fine texture that the stripes or lines left by the shadows of those parts of the grid that are impervious to Röntgen rays, are scarcely discernible to the naked eye, their effect being so little, in fact, that they become blended and appear as a kind of light veil. Thus in my device, without moving the grid, the same effect is brought about on the photographic plate as heretofore a uniform shifting of the grid would produce. If a fluoroscopic screen be used instead of the photographic plate, it presents to the eye of the observer an image of the sort just described. However, if the movable grid heretofore known be used, for either the photographic plate or the fluoroscopic screen, there can still be discerned, on such plate or screen, the troublesome image resembling a net or sieve.

The new grid can be made in different ways.

Figure 1 is a diagram, showing one form of my invention as used in connection with an X-ray tube.

Figure 2 is a fragmentary elevation showing a portion of the grid appearing in Figure 1, but upon an enlarged scale.

Figure 3 is a fragmentary perspective, showing another form of grid made in accordance with my invention.

Figure 4 is a fragmentary perspective, showing still another form of grid made in accordance with my invention.

The grid shown in Figures 1 and 2 is provided with very fine wires 5 of high atomic weight, each covered with material 6 of such character as to become viscid or moldable when subjected to a high temperature, and which is easily pervious to Röntgen rays. Lacquer, for example may be used for this purpose. The wires 5, covered with the lacquer or analogous material, are brought together in a firm bundle, and in this form are pressed while subjected, if necessary, to warmth. In this way is formed a mass of material which sticks together firmly, and which contains the wires 5, imbedded and disposed substantially parallel with each other, so as to permit Röntgen rays to pass through it easily. From the mass thus produced, slabs are cut off and bent to spherical curvature, so that the radius of curvature corresponds exactly with the distance between the focus of the Röntgen ray tube and the screen.

In Figure 1 is shown a grid 7, made as just described, and positioned as above stated relatively to an X-ray tube, which appears at 8.

A source of secondary Röntgen rays is shown at 9.

The radial directions of travel of the primary rays are indicated by conventional lines 10, and the directions of travel of the secondary rays are similarly indicated by lines 11.

It will be noted that with the grid thus constructed and arranged, the imbedded wires 5 extend lengthwise in the directions of travel of the primary Röntgen rays, but that the secondary Röntgen rays are intercepted.

In Figure 3 I show another form of my improved grid made in a simpler way. This grid comprises a number of thin leaves 12, of metal of such character as not to be very pervious to Röntgen rays. These metallic leaves 12 are severally coated on one or both sides with lacquer or other analogous substance, such as becomes sticky when exposed to a high temperature. The leaves thus coated are placed one on top of the other, and pressed together while exposed to heat.

From the mass thus produced, as shown in Figure 3, a grid is made up, as indicated at 7 in Figure 1. In consequence of the extreme fineness of the wires and the very small distance between them the total effect of the shadow is not more annoying than that of a fine sieve in an auto-type.

Another method of preparing my improved grid is by placing alternate layers of thin leaves of metal impervious to Röntgen rays and celluloid leaves and sticking them together by using pressure.

This method may be understood by reference to Figure 4 in which is shown a number of leaves 14 of metal impervious to Röntgen rays, alternated with a number of leaves 15, of celluloid. The leaves are all stuck together, under pressure.

In making the grid made as just described and as shown in Figures 3 and 4, the mass must be so cut that the plates extend at right angles to the general direction of the flat layer or mass, and the plates thus formed should then be bent cylindrically. The curvature of the surface of the grid thus formed should be chosen according to the distance to be used from the Röntgen tube to the grid, so that the focus of curvature of the grid will coincide with the source of the Röntgen rays; and so that the individual metallic leaves or sheets extend edgewise in the directions of travel of the primary rays.

Claims for patent:

1. The method herein described of constructing a Röntgen ray grid, which consists in bringing together a number of leaves of metal of high atomic weight and a number of leaves of material relatively transparent to Röntgen rays and to which said leaves of metal can be made to adhere, said leaves of metal being alternated with said second mentioned leaves and being so thin and close together that an image made by them when they are stationary appears to the eye as practically uninterrupted, and causing all of said leaves to adhere together as a unitary member.

2. A grid for transmitting primary Röntgen rays while substantially preventing the passage of secondary rays, consisting of a plurality of leaves of material transparent to Röntgen rays, interleaved face to face with a plurality of thin leaves of material opaque to Röntgen rays, all of said leaves adhering together and forming a grid which is self-sustaining, said opaque leaves being so thin that they cast no appreciable shadow on a fluorescent screen when held stationary between a Röntgen ray source and said screen, and parallel to said rays.

In testimony whereof I affix my signature.

GUSTAV BUCKY.